July 11, 1967 — E. F. GREEDY — 3,330,363
METHOD OF AND APPARATUS FOR HARVESTING VINE CROPS
Original Filed July 27, 1961 — 8 Sheets-Sheet 2
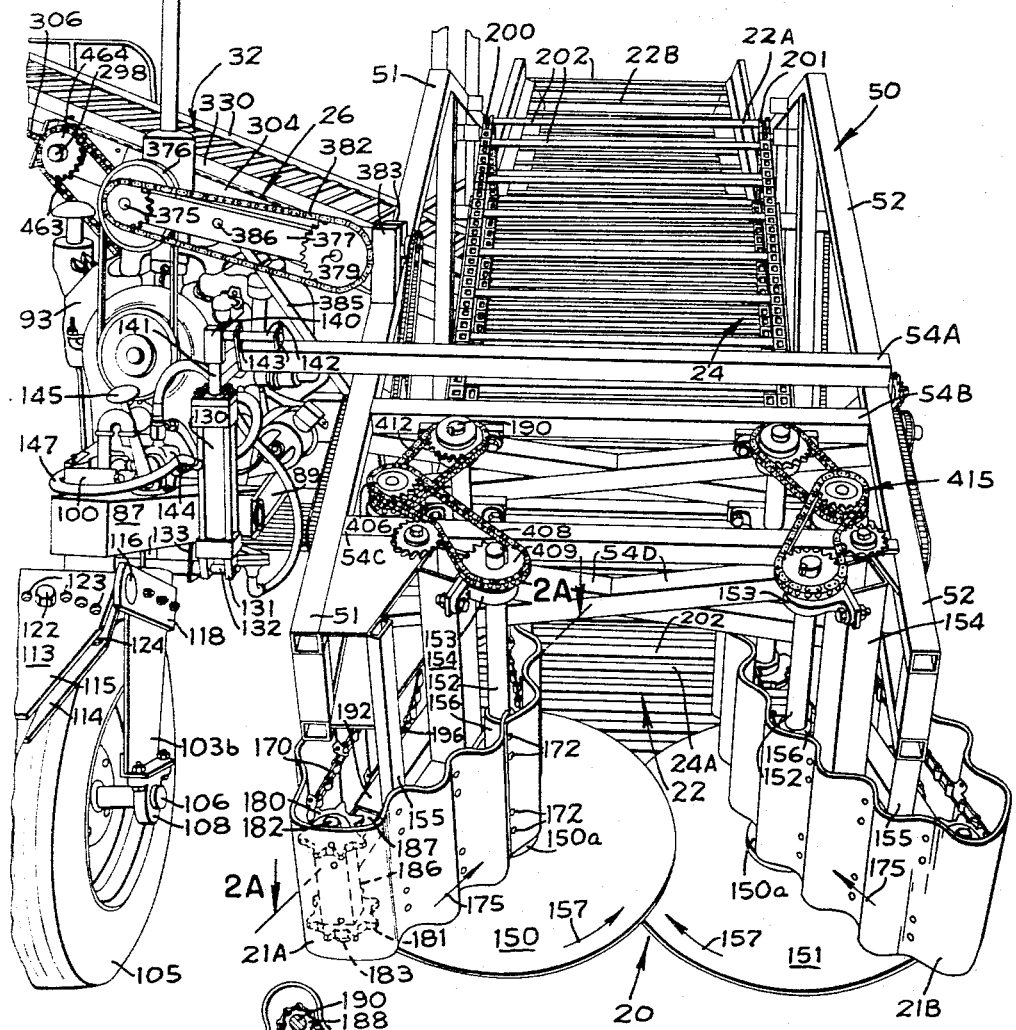
INVENTOR
EDWIN F. GREEDY
BY Hans G. Hoffmeister
ATTORNEY

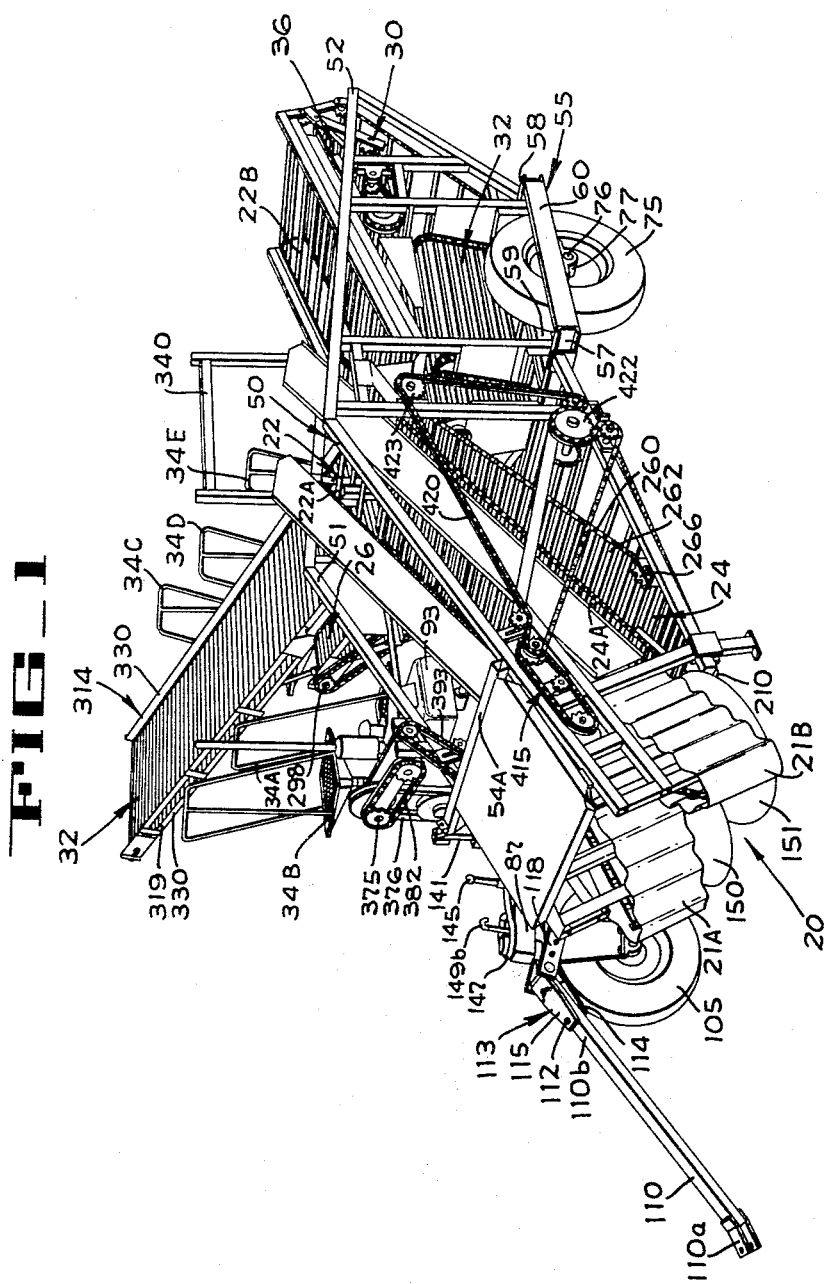

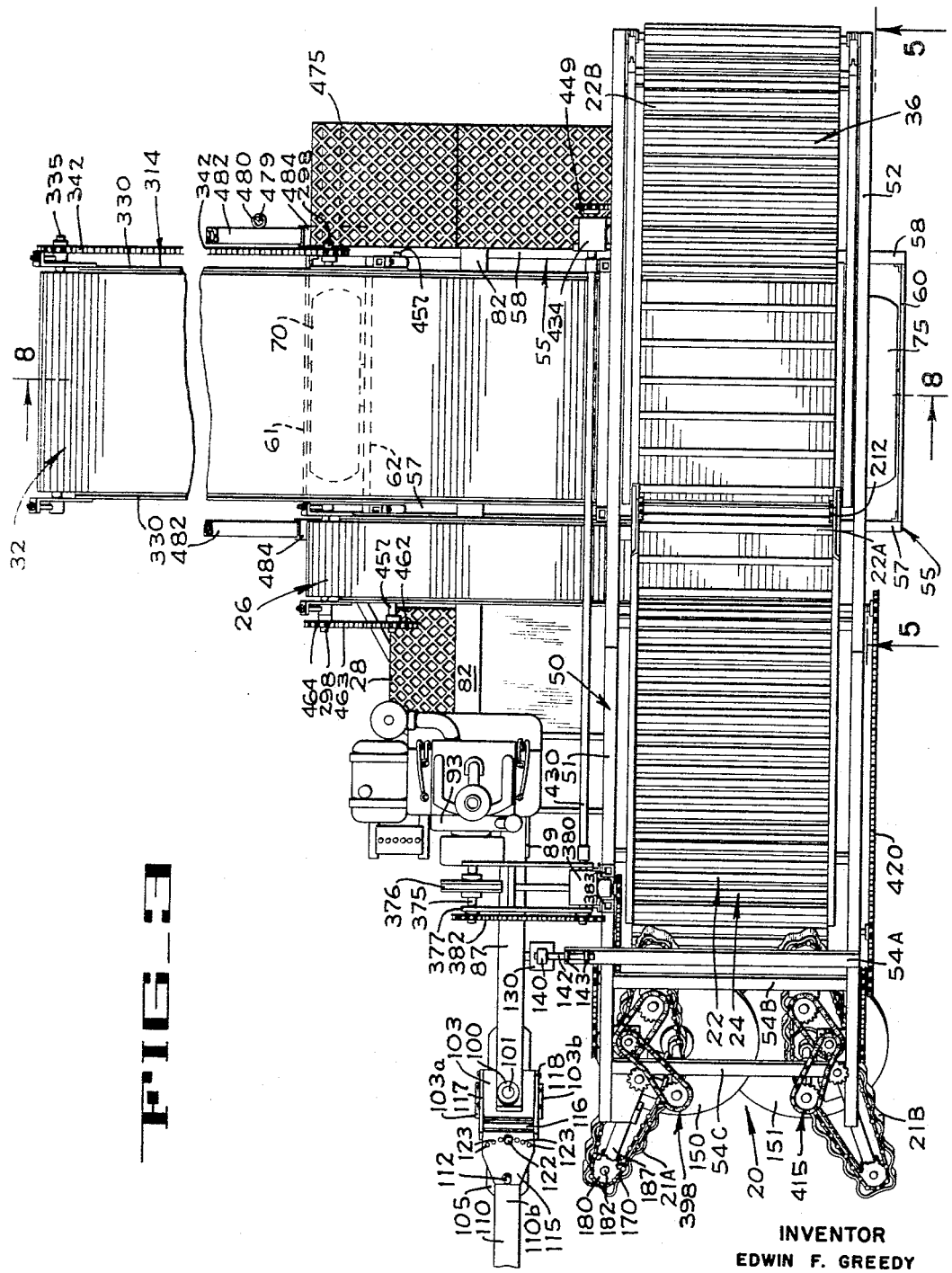

July 11, 1967 E. F. GREEDY 3,330,363
METHOD OF AND APPARATUS FOR HARVESTING VINE CROPS
Original Filed July 27, 1961 8 Sheets-Sheet 4

FIG_4

INVENTOR
EDWIN F. GREEDY
BY *Hans G. Hoffmeister*
ATTORNEY

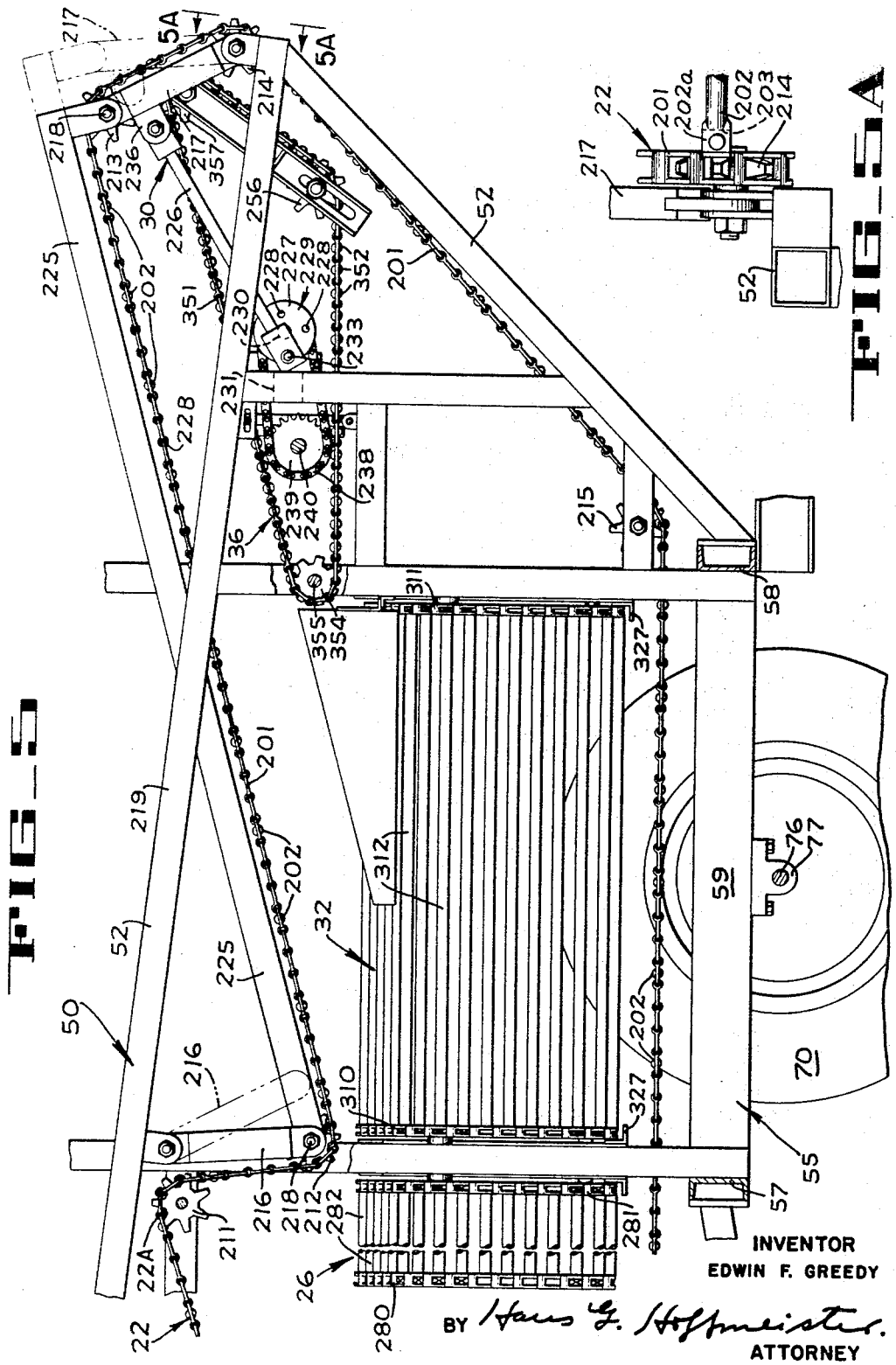

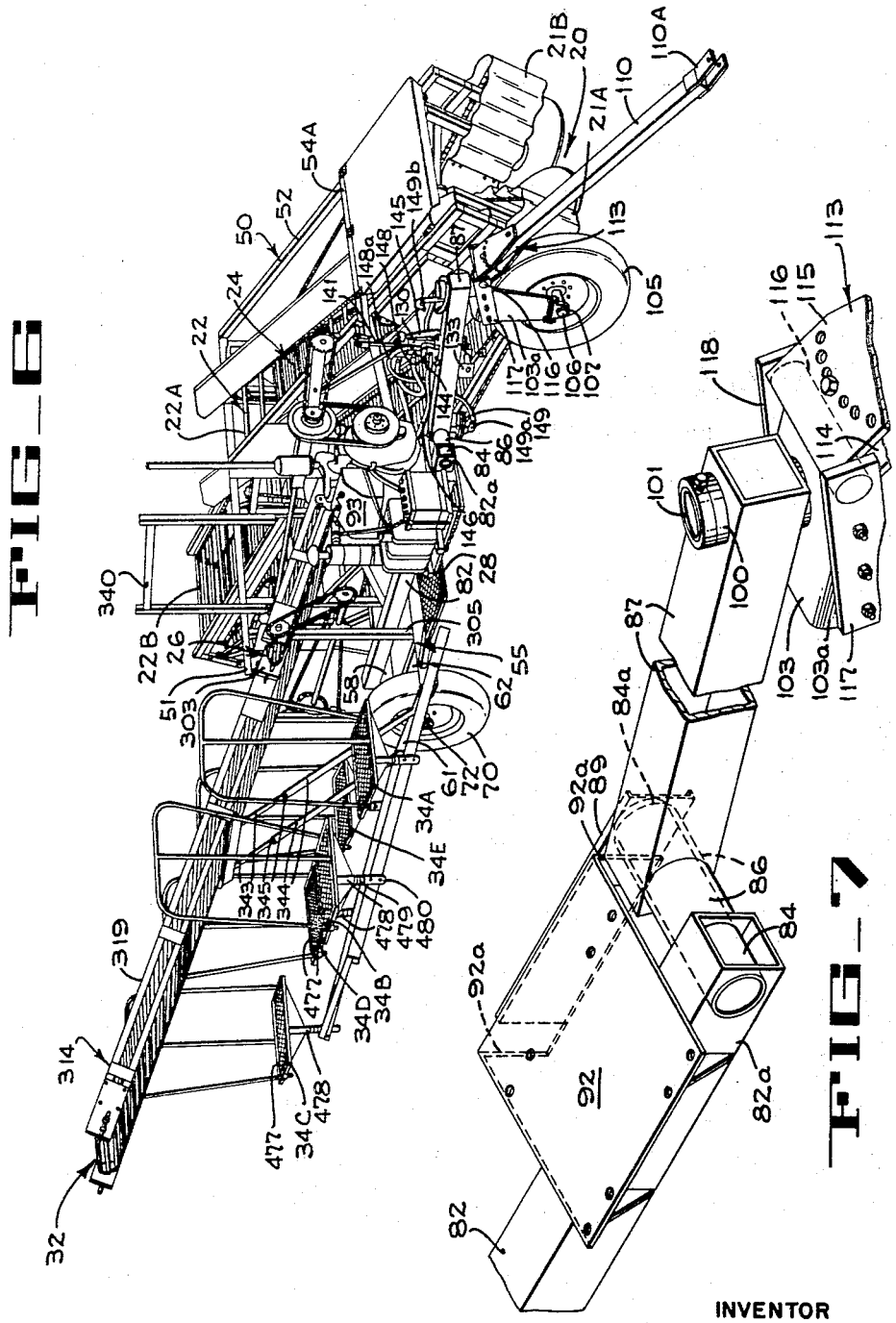

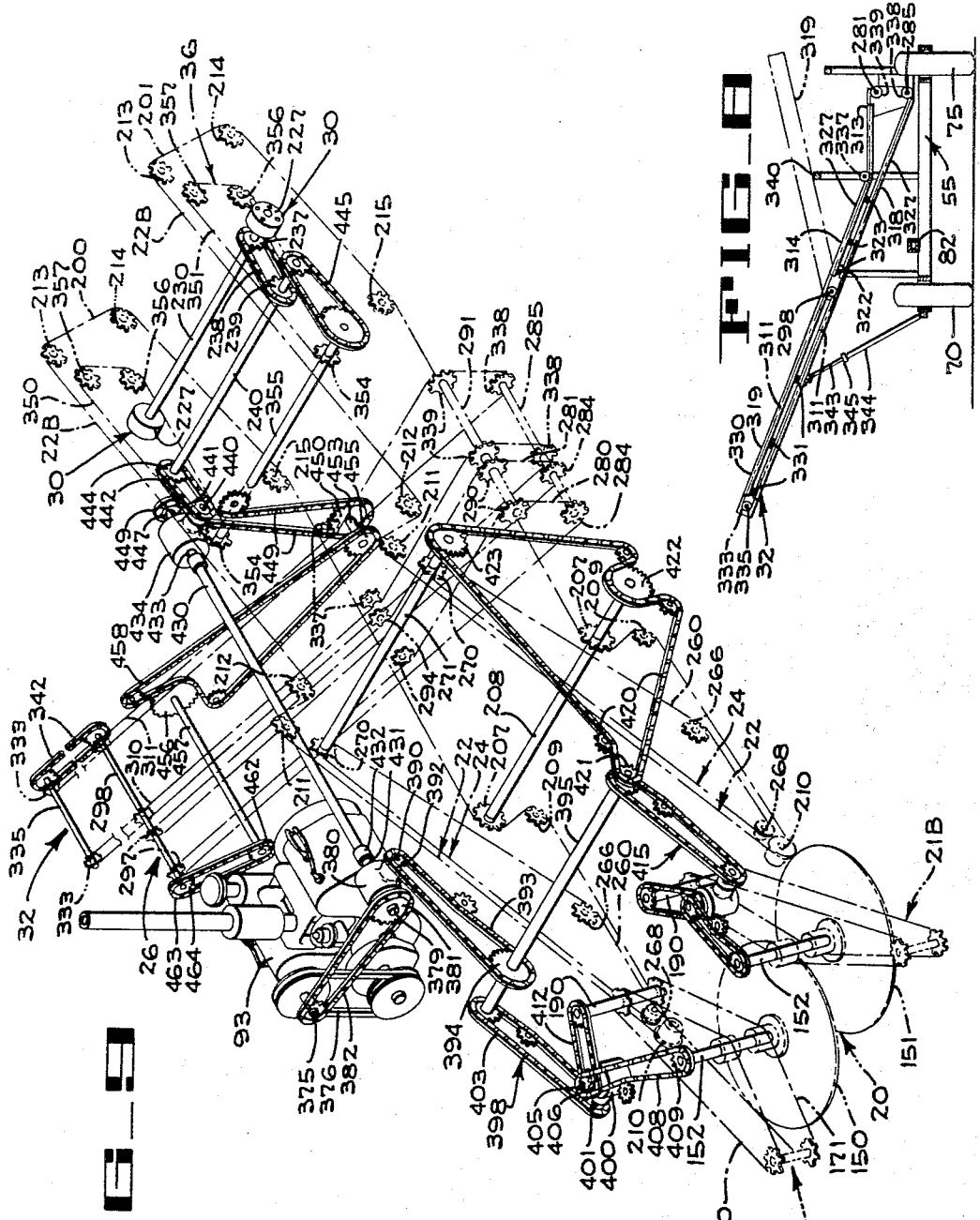

July 11, 1967
E. F. GREEDY
3,330,363
METHOD OF AND APPARATUS FOR HARVESTING VINE CROPS
Original Filed July 27, 1961
8 Sheets-Sheet 8
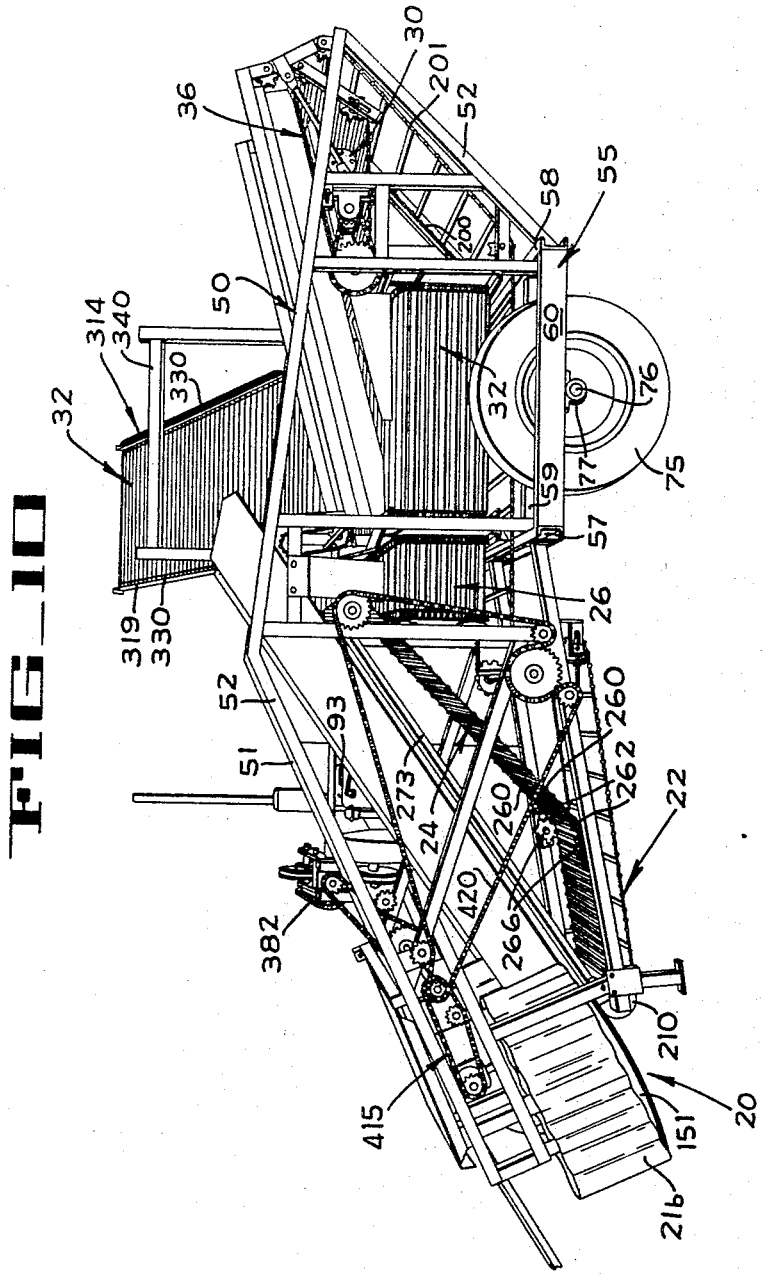
INVENTOR
EDWIN F. GREEDY
BY Hans G. Hofmeister.
ATTORNEY

United States Patent Office 3,330,363
Patented July 11, 1967

3,330,363
METHOD OF AND APPARATUS FOR HARVESTING VINE CROPS
Edwin F. Greedy, Hoopeston, Ill., assignor to FMC Corporation, San Jose, Calif., a corporation of Delaware
Original application July 27, 1961, Ser. No. 127,199. Divided and this application Dec. 3, 1964, Ser. No. 415,632
15 Claims. (Cl. 171—1)

The present application is a division of co-pending application Ser. No. 127,199 filed July 27, 1961, now forfeited, and assigned to the same assignee as the present application.

This invention pertains to the harvesting of vine crops, and more particularly relates to a method of and an apparatus for harvesting tomatoes and similar crops.

Vine crops, such as tomatoes, have heretofore been mechanically harvested principally by machines that engage the portions of the vine above ground, pull or cut the vines loose from its roots, and then separate the tomatoes from the vines. Such harvesters have not been altogether successful since the pulling action on the vines has damaged tomatoes, and no provision has been made for gathering tomatoes lying loose on the ground.

It is therefore an object of the present invention to provide a method of and apparatus for harvesting tomatoes and the like.

Another object is to provide an efficient digging mechanism for a harvester.

Another object is to provide an improved conveying system for use in a vine crop harvester.

Another object is to provide an improved vine pick up apparatus.

Another object is to provide an apparatus capable of gathering loose tomatoes, vines and tomatoes attached to vines and of separating both the loose and attached tomatoes from the vines.

Other and further features and advantages of the present invention will become apparent from the following description taken in connection with the accompanying drawings, in which:

FIGURE 1 is a diagrammatic perspective, with parts broken away, of a harvester of the present invention.

FIGURE 2 is a fragmentary diagrammatic perspective of the harvester looking at the forward end of the digging mechanism.

FIGURE 2A is a reduced diagrammatic section taken on line 2A—2A of FIGURE 2.

FIGURE 3 is a diagrammatic plan, with parts broken away, of the harvester of FIGURE 1.

FIGURE 4 is a diagrammatic side elevation of the harvester, particularly showing the conveyor system of the harvester.

FIGURE 5 is an enlarged vertical section taken on line 5—5 of FIGURE 3.

FIGURE 5A is an enlarged fragmentary section taken on line 5A—5A of FIGURE 5.

FIGURE 6 is a diagrammatic perspective of the harvester.

FIGURE 7 is an enlarged, fragmentary diagrammatic perspective of a portion of the harvester.

FIGURE 8 is a reduced diagrammatic section taken on line 8—8 of FIGURE 3.

FIGURE 9 is a schematic perspective of the drive mechanism of the harvester of FIGURE 1.

FIGURE 10 is a diagrammatic side elevation of the harvester.

The embodiment of the tomato harvester chosen to illustrate the present invention includes, in general, a disc-type digging mechanism 20 (FIGS. 1 and 2) which is arranged to remove tomatoes and vines from the ground, a pair of corrugated or fluted pick up belts 21A and 21B that cooperate with the digging mechanism to convey the tomatoes and vines rearwardly to the lower end of an endless, bar-type elevating conveyor 22. As the vines, dirt, and tomatoes are carried upwardly, some dirt clods and loose ripe tomatoes tend to fall through the bar-type conveyor 22 but are supported by the upper run 24A of an endless drop-off conveyor 24 (FIG. 4) which underlies the upper run of conveyor 22. Dirt, gravel and small objects will, of course, fall through both conveying surfaces and be separated from the vines at this point. When the upper end of the upper run 24A is reached, the dirt clods and loose tomatoes supported by conveyor 24 are dropped onto a lateral conveyor 26 which will be referred to hereinafter as the dirt conveyor and which, as seen in FIGURE 3, carries the material past an inspection station 28 where the tomatoes may be removed by one of two inspectors located at this point, permitting the dirt clodes to be discharged over the end of conveyor 26 onto the ground. Accordingly, the three conveyors 22, 24, and 26 are effective to first separate dirt, gravel and small objects from the vine mass, and then separate dirt clods and loose tomatoes from the mass.

The vines with tomatoes clinging thereto continue moving upwardly to a peak portion 22A (FIG. 4) of the vine conveyor 22 and are dropped down onto a shaker section 22B of the vine conveyor. This shaker section is continuously reciprocated back and forth in a direction longitudinally of a machine by a drive mechanism 30 (FIG. 5). The reciprocating movement of the conveyor section 22B is such that the vines are bounced around haphazardly as they travel along. The agitation of the vines is of sufficient intensity to snap the stems of the tomatoes, causing the tomatoes to fall away from the vines and drop between the bars of the vine conveyor 22 onto a second transverse conveyor 32, hereinafter referred to as the tomato discharge conveyor, which transports the tomatoes laterally past inspectors standing on platforms 34A–34E (FIG. 6) disposed on opposite sides of the conveyor 32. The inspectors remove green tomatoes and fragments of vines, and permit the ripe tomatoes to be discharged into suitable receptacles for transportation to a cannery. Referring to FIGURE 5, it will be noted that the tomato discharge conveyor 32 underlies only a portion of the shaker section 22B. Tomatoes, that are not dropped directly onto the sorting conveyor, are dropped onto an auxiliary endless, tomato return conveyor 36 which has an upper run movable downwardly toward the sorting conveyor to deliver the tomatoes onto that conveyor.

The depleted vines are carried upwardly over the end of the upper run of conveyor 22 and discharged onto the ground behind the forwardly moving machine.

Main support structure

The main support structure 50 (FIG. 2) of the machine comprises a pair of longitudinal side sections 51 and 52 which are substantially identical and are rigidly held together in laterally spaced relation by suitable transverse structural members including beams 54A, 54B, 54C, cross braces 54D, and a box-like frame 55 (FIG. 1). The frame 55 includes two spaced transversely extending channels 57 and 58 which are connected at one side of the machine by two spaced longitudinally extending members 59 and 60 and, at the other side of the machine, by two other spaced longtudinally extending members 61 and 62 (FIG. 3). The members of the frame 55 are suitably secured to each other, as by welding, to form a rigid unit, and are secured to the side frame sections 51 and 52 to rigidly interconnect these sections.

A rear traction wheel 70 is mounted on a short shaft 72 that is journalled in bearing units secured to the longitudinal members 61 and 62. Similarly a second rear wheel 75 (FIG. 1) is mounted on a short shaft 76 that is journalled in bearing units 77 secured to longitudinal members 59 and 60.

At a point disposed inwardly of the rear wheel 70 (FIG. 6), a longitudinally extending box-beam 82 is welded to the upper surfaces of the box frame 55. The forward end 82a (FIG. 7) of the beam 82 has a transverse opening in which a sleeve 84 is welded, the sleeve having a journal portion 84a projecting laterally from the beam 82. A sleeve 86, that is welded to a front wheel support arm 87, is rotatably supported on the journal 84a, which also extends through a transverse opening in the wheel arm 87 and through a retaining plate 89. The wheel arm 87 and its sleeve 86 is held on the journal 84a by the retaining plate 89 which is removably secured, as by bolts (not shown) to a depending flange 92a of an engine mounting plate 92, that carries a gasoline engine 93 (FIG. 6) and is welded to the box beam 82.

At its forward end, the wheel support arm 87, which is a hollow shaft that is square in cross-section, carries a vertically extending sleeve 100 which rotatably journals a vertical stub shaft 101 that is secured to and projects upwardly from a yoke 103. A front wheel 105 (FIG. 6) is mounted on an axle 106, which is journalled in a bearing 107 secured to the lower end of one leg 103a of the yoke and in a bearing 107 (FIG. 2) which is carried on the other leg 103b of the yoke. A draw bar 110 (FIG. 6) has a forward end 110a adapted to be secured to the towing tractor and a rear end 110b, which is pivotally connected by a bolt 112 to a bracket 113. The bracket 113 comprises two spaced plates 114 and 115 (FIG. 2) whose rear end portions are joined together by a rod 116 which is welded to both plates. As seen in FIGURES 6 and 2 the ends of the rod 116 are journalled in fixed arms 117 and 118 that are removably connected to the yoke legs 103a and 103b, respectively. The position of the draw bar 110 in the bracket 113 is determined by a removable, headed pin 112 (FIG. 2) which may be selectively positioned in any one of a plurality of holes 123 that are provided in the plate 115 on the arc of a circle that has the bolt 112 as center. The removable pin 122 extends through the plate 115, a hole (not shown) in the draw bar 110, and through a hole 124 in the lower plate 114, there being one hole 124 in plate 114 in alignment with each hole in the upper plate 115. The removable pin 122 makes it possible to change the angularity of the drawbar with respect to the harvester so that, if necessary, the alignment of the tractor and the rear wheels 70 and 75 of the harvesting machine may be varied to accommodate the vine rows. In setting up the equipment in the field, the harvester must first be aligned with the row of vines and then the tractor wheels must be arranged to pass between the rows. The detachable pin connection makes this adjustment possible.

The wheel support arm 87 is connected to the main frame by means of a hydraulic cylinder 130 (FIG. 2) has spaced ears 131 at its lower end, that are pivotally mounted on a rod 132 which is rigidly supported by two ears 133 depending from the under side of the wheel support arm 87. A block 140 is fixed to the upper end of the piston rod 141 of the hydraulic cylinder, and the block pivotally engages a short rod 142 that is fixed to two ears 143 secured to and projecting upwardly from the fixed frame member 54A. Referring to FIGURE 6, it will be evident that, since the power cylinder 130 is connected between the main frame and the wheel support arm 87, actuation of the cylinder will cause the machine to jackknife about the axis of sleeve 86. The cylinder 130 will hold the main frame in any adjusted position and, accordingly, the position of the digging mechanism 20 relative to the ground can be selectively chosen and maintained.

*Digging mechanism*

The movements of the piston rod of cylinder 130 are controlled by a valve 144 which is actuated by a manually controlled lever 145. The valve has a neutral position, a position in which the piston in the cylinder is raised, and a position in which the piston is lowered. A hose 146 (FIG. 6) connects the valve to an oil pump embodied in the engine 93. A hose 147 connects the valve to the hollow wheel support arm 87 which is closed at its ends to form a fluid reservoir. A hose 148 (FIG. 6) extends from the valve to the upper end of the cylinder, and a hose 148a extends from the lower end of the cylinder to the valve. A hose 149 connects the oil pump to a filter 149a which is mounted on the wheel support arm 87 and is in flow communication with the reservoir. The reservoir is vented by pipe 149b.

*Digging mechanism*

The digging mechanism 20 of the present invention comprises two steel discs 150 and 151 (FIG. 2) each of which is attached to a hub 150a that is keyed to the lower end of the drive shaft 152. The shaft 152 is supported against vertical movement and for rotation about its longitudinal axis in an upper bearing 153 and a lower bearing 153a (FIG. 2A) that are held in fixed position relative to the frame by suitable structural members including rigid upright posts 154 and 155. A pair of wooden sleeves 156 (one only being shown) are set-screwed to each shaft 152. One sleeve being disposed below the lower bearing 153a and the other disposed above the bearing. The shafts 152 are rotated by a drive mechanism which will be described hereinafter.

The discs 150 and 151, which may be about 26 inches in diameter, are so arranged that their inner edges overlap and move rearwardly as indicated by arrows 157. The operating position of the forward edges of the disc is approximately one to two inches below the surface of the ground. This position enables the discs to sever the root system from the plant with a minimum disturbance of the attached tomatoes. It also assures that all loose fruit, which may be lying on the surface in the row prior to harvesting, will be gathered along with the vines and not left on the ground as a total loss. The harvesting of loose fruit in this manner is an important factor since the loose fruit on the ground often reaches proportions as high as 20% of the total crop. Another important advantage of dipping the discs into the ground results from the fact that a thin layer of soil is scooped up by the discs. This layer of dirt functions as a cushion and also as a traction medium in the conveying of the loose tomatoes. In one embodiment, the discs are tilted at approximately 25° from the horizontal. However, the discs will perform their function of severing and conveying within a range defined by a horizontal position and a position tilted approximately 35° to the horizontal.

*Pick up belts*

The two pick up belts 21A and 21B of the present invention are identical but oppositely disposed; accordingly, a description of belt 21A will serve to disclose the construction and operation of belt 21B also. The belt 21A is made of leather of any similar material that may be formed into a corrugated configuration having yieldable walls. Two endless chains 170 (FIG. 2) and 171 (FIG. 2A) are provided with special flanged links that are riveted to the inner face of the belt at spaced points, the portions of the belt between the riveted connections being greater in length than the associated length of chain between rivets so that the portions of the belt between riveted connections bulge outwardly to give the belt a corrugated configuration. One line 172 of the riveted joints not only secures the special links of the chains to the belt but also secures overlapped ends of the belt to each other to form the belt in an endless arrangement.

The inner walls of the belts 21A and 21B move rearwardly, as indicated by arrows 175, to push vines and dirt rearwardly over the discs 150 and 151 to the bar-type elevator conveyor 22.

The chains 170 and 171 of each belt are trained around sprockets 180 and 181, respectively (FIG. 2), that are rotatably journalled on stub shafts 182 and 183, respectively, which project from opposite ends of a cross member 186 of a T-shaped support arm 187. The chains are also directed over the spaced wooden sleeves 156 on shaft 152 and around spaced sprockets 188 (one only being shown in FIG. 2A) on a drive shaft 190 that is journalled for rotation in suitable bearings fixed in the main support structure of the machine.

The T-shaped support arm 187 is part of a chain take-up mechanism which includes a tube 192 that recieves the shank 187a of the T-shaped arm and is welded to the fixed posts 154 and 155. The rear ends of the shank 187a and of the tube 192 are closed by fixed plates, and a screw 195 that is threaded through the end plate of tube 192 abuts the face of the end plate of shank 187a and determines the adjusted position of the shank in the tube. Both the shank 187a and the tube 192 are square in cross-section, accordingly, no rotary movement between these members is possible. The drive mechanism for shaft 190 will be explained presently; however, it will be evident that in operation the shaft 190 is rotated in the proper direction to cause the inner runs of belts 21A and 21B to move rearwardly over the discs 150 and 151.

A scraper blade 196 (FIG. 2A) is mounted on the outer side of each tube 192 so that its lower edge is closed above the associated disc 150 or 151. Thus, if dirt or other material clings to the upper surface of the disc, it will be intercepted by the scraper and guided outwardly off the side of the disc.

*Conveying system*

The vine conveyor 22 comprises two spaced endless chains 200 and 201 (FIG. 2) which are connected by a plurality of transverse bars 202. As seen in FIGURE 5A, each conveyor bar 202 is a tubular member that has flattened ends 202a (one only being shown). Each flattened end is riveted to a tab 203 formed on a link of the chain to which the end is connected.

Each of the two chains 200 and 201 is trained around an identical series of drive and idler sprockets. Referring to FIGURE 4, which illustrates chain 201 and its associated sprockets, it will be noted each chain is driven by a sprocket 209 keyed to a horizontal transverse shaft 208 which is journalled for rotation in bearings in the main support structure. After passing around drive sprocket 209, the chain passes over an idler sprocket 207 which may be mounted on a conventional chain tensioning mechanism. At the forward end of the machine, the chain passes around guide roller 210 that has an outer flange, and then moves upwardly and rearwardly and is trained successively over idler sprockets 211, 212, 213, 214 and 215. It will be evident that, when shaft 208 is driven counterclockwise (FIG. 4), the lower run of the conveyor is moved forwardly and the upper, vine-conveying run of conveyor 22 is moved rearwardly to carry the vine mass away from the digging discs and the corrugated pick up belts. The flanged rollers 210 keep the conveying belt centered and provide smooth contact surfaces which eliminate the possibility that stones will dislodge the chains.

The stepped roller 210 and sprockets 211, 214 and 215 are rotatably supported on studs projecting laterally from the side sections 51 and 52 of the main frame. However, the idlers 212 and 213 (FIG. 5) are rotatably mounted on studs 218 carried by the outer ends of levers 216 and 217, respectively. The levers 216 and 217 are pivoted at their inner ends on a fixed rail 219 of the associated frame side section. A rigid bar 225 is pivotally connected to each of the studs 218 alongside the sprockets 212 and 213. As previously mentioned, the section of the conveyor 22 between sprockets 211 and 214 is a shaker section wherein the run of the conveyor is inclined at about 15° to the horizontal and is reciprocated longitudinally of the machine to agitate the vines and cause the tomatoes to be separated from the vines. The reciprocation of the shaker section is carried out by the drive mechanism 30 which includes two identical crank mechanisms 229 (one only being shown in FIG. 5). Each crank mechanism is disposed closely adjacent one of the side frame sections 51 or 52 and has a connecting rod 226 (FIG. 5) disposed approximately in the vertical plane of the idler sprockets at that side of the machine. The crank mechanisms are identical, and accordingly, only the mechanism associated with side frame section 52 (FIG. 5) will be described in detail. Each crank mechanism comprises a crank disc 227 which has four holes 228 (two only shown) drilled therethrough at different radial distances from a shaft 230. The shaft 230 extends transversely between the side frame sections 51 and 52 and is journalled for rotation in bearings carried by a transverse beam 231 of the main frame. The connecting rod 226 is pivotally connected to the crank disc 227 by a shouldered stud 233 that may be selectively secured in any one of the four holes of the crank disc. It will be apparent that the throw of the connecting rod and the amount of reciprocating movement of the shaker section may be varied by selectively positioning the pivot stud in the different holes of the crank disc. At its other end, the connecting rod 226 is pivotally connected to a short arm 236 formed on lever 217. The shaft 230 is driven by an endless chain 238 that is trained around a sprocket 237 (FIG. 9), that is secured to shaft 230, and around a sprocket 239 keyed to a transverse drive shaft 240. The drive mechanism for shaft 240 will be described hereinafter in connection with the drive train of the entire machine. In general, when shaft 240 is rotated, the two crank mechanisms 229, operating in unison, swing the lever arms 217 at each side of the machine through an arcuate path about the axes of sprockets 213. Oscillating movement of the levers 217 causes reciprocating movement of the two bars 225 and oscillation of the lever arms 216. Since the conveyor chain is trained around sprockets carried by the oscillating lever arms, the shaker section of the conveyor run will be reciprocated longitudinally of the machine. It is to be particularly noted that, during this reciprocating movement of the shaker section, the conveyor chain continues to move rearwardly. Accordingly, while the vines are being agitated, they are also conveyed rearwardly to the discharge end of the vine conveyor 22. The transverse bars of the vine conveyor are spaced apart a distance sufficient to permit all the tomatoes, that are shaken from the vines, to fall through the space between the bars. It has been found that a spacing of approximately five inches between bars is satisfactory for this purpose.

In regard to the extent and speed of the shaking action, a satisfactory tomato-separating shaking action is obtained if the shaker stroke is approximately four inches and the frequency of the shaking action is approximately 200 cycles per minute. However, variation in field conditions occur due to differences in plant variety, temperature, level of maturity, humidity, and plant diseases. Therefore, the four holes 228 in the crank discs 227 provide for shaker strokes of three, three and one-half, four and four and one- half inches. In FIGURE 9, the chain 238 is shown disposed around one particular pair of sprockets for driving the shaft 230 from shaft 240. However, it has been found advantageous to provide three other pairs of sprockets (not shown) around which the chain may be selectively trained so that, in all, four shaker frequencies of 180, 200, 220, and 240 cycles per minute may be obtained.

It is to be noted that the illustrated embodiment provides a certain positional relationship between the sprockets 211–214; that is, the axes of all of the sprockets 207, 209–215 are intersected by an imaginary closed curve and the axes of sprockets 211 and 214 are intersected by an imaginary straight line, said curve and line serving as references. Said positional relationship is such that the auxiliary, movable inner sprockets 212 and 213 are between said main, guiding outer sprockets 211 and 214, with respect to said curve, and such that these inner sprockets are on opposite sides of said line. Although this relationship is very satisfactory, other relationships may be employed to achieve reciprocation of the shaker section 22B of the vine conveyor 22.

The drop-off conveyor 24 is of the same general construction as the vine conveyor 22 and comprises two endless chains 260 (one only being shown in FIG. 1) that are connected by transverse steel tubes 262. The ends of the tubes are flattened or collapsed for attachment to the chains. Each chain is trained around an idler sprocket 266 (FIG. 4) that is mounted in a convenional chain tightening mechanism (not shown) which is secured to the main support structure. Near its forward end, each chain is trained over a guide roller 268 that has a flange on its outer side and is mounted on a fixed stud or the like projecting from the side frame section. The chain is driven by a sprocket 270 that is secured to a transverse power shaft 271. When the shaft is rotated clockwise (FIG. 4) the upper run of the drop-off conveyor moves upwardly and rearwardly. Suitable guide straps 273 (FIG. 10) are provided to support the upper runs of the two chains 260 and hold them close to the upper flight of the vine conveyor 22. With this arrangement, the drop-off conveyor 24 assists the vine conveyor in carrying the load of vines, tomatoes, and foreign matter. The distance between the centers of the tubes 262 is about one inch so that gravel and small objects are permitted to fall through while loose tomatoes and large stones are prevented from falling through.

The transverse dirt conveyor 26 is similar in construction to the drop-off conveyor 24 and comprises two spaced endless chains 280 and 281 (FIG. 5) connected by cross tubes 282. Each chain is trained around an idler sprocket 284 rotatably mounted on a shaft 285 that is mounted in the machine alongside the side frame section 52. From sprocket 284, each chain passes upwardly over an idler sprocket 290 that is rotatable on a second longitudinal shaft 291 which is mounted immediately above shaft 285. Each chain is also trained under an idler sprocket 294 (FIG. 9) rotatably mounted on a suitable stub shaft projecting from the adjacent side frame section 51 and around a drive sprocket 297 that is secured to a shaft 298 carried at the upper end of the conveyor. As seen in FIGURE 6, the portion of conveyor 26, that projects laterally from the main conveyor, is inclined upwardly and is formed by two rigid side frame members 303 and 304 which are supported from the main support structure by suitable means including a vertical post 305. The previously mentioned shaft 298 extends through the side members 303 and 304 and is journalled in a chain-take-up mechanism 306 (FIG. 2). The side rails of the side frame members extend above the conveying surface to provide side guide rails which prevents material from dropping off the sides of the conveyor.

The tomato discharge conveyor 32 comprises two endless chains 310 and 311 (FIG. 5) connected by transverse tubes 312 which have flattened ends for connection to the chains. As seen in FIGURE 8, the upper run of the conveyor 32 has a horizontally disposed section 313 underlying the shaker section of conveyor 22 and an upwardly inclined section 314 that carries the tomatoes to an elevated discharge end. The conveyor flights are guided in a frame which is made up of two parts, a fixed lower section 318 (FIG. 8) and an upper section 319 that is hinged on the lower section by means of shaft 298. The lower frame section 318 includes two identical side frames 322 (one only being shown) that are secured together by transverse rods 323 and are suitably secured to the main support structure. Each side frame includes angle members 327 that have inwardly projecting ledges which provide support surfaces for the conveyor chains. The upper frame section 319 comprises two identical side frames 330 that are connected by cross members 331. The side frames project upwardly above the side edge of the conveying surface to guide the tomatoes as they are elevated. Each of the chains is trained around a sprocket 333 (FIG. 9) that is secured to a drive shaft 335 that is journalled for rotation at the upper end of the side frame members 330. Also, each chain engages an idler sprocket 337 that is rotatable on a suitable stub shaft (not shown), an idler sprocket 338 on shaft 285, and an idler sprocket 339 on shaft 291. The drive shaft 335 is driven by shaft 298 by means of a chain and sprocket drive 342 which is carried by one of the side frame members 330. The distance between the bars of conveyor 32 is such that tomatoes cannot fall through this space.

As seen in FIGURE 8, the upper section 319 of the conveyor can be pivoted clockwise about shaft 298 to overlie the vine conveyor 22 and rest on a support structure 340. In this pivoted position, the harvester can be towed along a highway or the like without presenting any obstructions to other traffic. A pair of rods 343 are pivotally connected to a cross-brace of the upper conveyor section 319, and a pair of tubes 344 are pivotally mounted on the main support structure. When the upper section 319 is swung to a position of alignment with the lower section 318, the rods 343 are telescoped into the tubes 344, and collars 345 and the rods abut the upper ends of the tubes to hold the upper section in the desired position.

The tomato return conveyor 36 is similar in construction to the other conveyors and comprises two chains 350 and 351 (FIG. 9) connected by transverse steel tubular bars 352 (FIG. 5) having flattened end portions. The chains are trained around drive sprockets 354, secured on a transverse drive shaft 355, and around idler sprockets 356 and 357. The idler sprockets may be carried on studs projecting from the main support structure or may be carried in suitable chain tighteners. It will be evident that, when shaft 355 is rotated counterclockwise, tomatoes on the upper run of the conveyor 36 will be carried downwardly and dumped onto the tomato discharge conveyor 32.

*Drive mechanism*

The engine 93 (FIG. 9) drives a shaft 375 through a belt and pulley mechanism 376. The shaft 375 is journalled for rotation in the outer end of a support frame 377 (FIGS. 2 and 3) that is pivotally mounted at its inner end on a shaft 379 of a gear box 380. The shaft 375 drives a sprocket 381 keyed on shaft 379 by means of a chain 382. The gear box is bolted to structural members 383 that are welded to side frame 51. An angularly disposed brace 385 (FIG. 2) is secured to a rod 386 of frame 377 and to the frame 51 to rigidly support the frame 377 in a generally horizontal position. A shaft 390 (FIG. 9) projecting from gear box 380 has a sprocket 392 secured thereto for driving, by means of a chain 393 and a sprocket 394, a countershaft 395 which extends transversely over conveyor 22 and is suitably journalled for rotation in the main support structure.

Adjacent one end the countershaft 395 is connected to a drive mechanism 398 which is effective to cause rotation of disc 150 and movement of the chains 170 and 171 of the pick up belt 21A. The drive mechanism 398 includes a gear box 400 which has a shaft 401 that is driven from countershaft 395 by a chain 403 that is trained around sprockets keyed to shafts 395 and 401. A drive shaft 405, which extends upwardly from the gear box 400, has a double sprocket 406 secured thereto. The upper member of sprocket 406 drives the disc drive shaft 152 by means of a chain 408 that is trained around a sprocket 409 keyed to shaft 152. The lower member of double sprocket 406 is connected to the pickup belt drive shaft 190 by means of a chain 412.

Adjacent its other end the countershaft 395 is connected to a drive mechanism 415 that is identical to the above-mentioned drive 398 but is so arranged that, whereas drive 398 causes the drive shaft 152 of disc 150 to rotate counterclockwise and the drive shaft 190 of pick up belt 21A to rotate counterclockwise, the drive 415 causes the drive shaft 152 of disc 151 to rotate clockwise and the drive shaft 190 of pick up belt 21B to rotate clockwise.

The countershaft 395 also drives the power shaft 208 of the vine conveyor 22 and the power shaft 271 of the drop-off conveyor 24 by means of a chain 420 which is trained around a sprocket 421 keyed to countershaft 395, a sprocket 422 keyed to power shaft 208, and a sprocket 423 keyed to shaft 271. It will be understood that shaft 208 is rotated counterclockwise (FIG. 9) while shaft 271 is rotated clockwise.

A second countershaft 430 is coupled at one end to a drive shaft 431 of gear box 380 by a coupling 432. At the other end, the countershaft 430 is coupled to a shaft 433 of a gear box 434. A shaft 440, projecting at right angles from gear box 434, has a sprocket 441 secured thereon which drives the shaft 240 by means of a chain 442 trained around sprocket 441 and around a sprocket 444 keyed to shaft 240. As previously mentioned, shaft 240 drives the shaft 230 on which the two crank discs 227 are secured. The shaft 240 also drives the drive shaft 355 of the return conveyor 36 by means of a chain and sprocket drive 445.

A shaft 447, projecting from one end of gear box 434, carries a sprocket around which a chain 449 is trained. This chain 449 is also trained over a sprocket 450 secured to a shaft 453 which is journalled for rotation in the frame. A sprocket 455, keyed to shaft 453, drives a sprocket 456, that is secured to a rotatable shaft 457, by means of a chain 458 trained over both sprockets. The shaft 457 extends under the tomato discharge conveyor 32 and under the dirt conveyor 26. A sprocket 462 secured on the shaft 457 is connected by a chain 463 to a sprocket 464 that is secured to the shaft 298. As previously mentioned, the shaft 298 drives the dirt conveyor 26 directly and drives the tomato discharge conveyor 32 by means of sprocket and chain drive mechanism 342.

From the foregoing description it will be evident that all the mechanisms of the machine are driven by the engine 93 and that, by properly choosing the size of sprockets and gear boxes, the desired speeds of the various mechanisms can be obtained.

Referring to FIGURES 3 and 6, it will be noted that the machine has provision for eight sorters. Two sorters are positioned at station 28, one sorter on each of the five platforms 34A–34E, and one sorter on a platform 475 (FIG. 3). It is to be particularly noted that the operator on platform 34A can sort material moving along the tomato discharge conveyor 32 or material moving along the dirt conveyor 24 merely by turning his body 90 degrees. Thus the positioning of the platform 34A adjacent the end of conveyor 24 and alongside conveyor 32 makes it possible for one sorter to perform two sorting jobs.

Each of the platforms 34A–34E is constructed of expanded steel welded to a suitable frame 477. At its lower side, the frame 477 is provided with a hollow hub 478 that fits over a pin 479 which is pressed in and projects upwardly from a cylindrical boss 480 welded to a rectangular frame 482. The frame 482 is made of square tubing with suitable cross bracing, and it is supported from the main support structure by means of two tubular sockets 484 (FIG. 3) which are welded on the main support structure and receive the lower ends of the side tubular members of the frame in telescoped relation.

To set up the harvester for operation in the field, it is necessary to first make the necessary adjustment in the angularity of the drawbar 110, by selectively positioning the pin 122 in one of the holes 123 in the bracket 113, so that the discs of the harvester are aligned with the row and the tractor wheels pass between the rows. Next, the discs are lowered to a position in which their forward edges are slightly under the surface of the ground. This adjustment is made by manipulating lever 145 to actuate the hydraulic cylinder 130.

With the discs in proper position and the conveyors all operating, the harvester is towed along the vine row. The discs, operating below the surface of the ground, sever the root system of the plant with a minimum of disturbance to the attached tomatoes. The discs also cut off a thin layer of top soil and convey rearwardly the vines, the layer of soil, and any loose tomatoes lying on the ground in the path of forward movement of the discs. The dirt layer functions as a cushion for the tomatoes and as a traction medium in the conveying of the loose tomatoes. As the vines, dirt, loose tomatoes, and stones are scooped up and moved rearwardly by the discs, the fluted belts compact the vines and draw them rearwardly.

On the initial part of the vine conveyor 22, dirt, gravel and small objects fall through the conveyors 22 and 24 onto the ground thus causing a first separating action. Since the bars of the vine conveyor are spaced apart a distance sufficient to permit tomatoes to pass therethrough, loose tomatoes and dirt clods will pass through the upper run of conveyor 22 and rest on the closely spaced bars of the upper run of the drop-off conveyor 24 which is disposed close beneath the upper run of conveyor 22. When the upper end of the drop-off conveyor is reached, these loose tomatoes and clods drop onto the dirt conveyor 26, completing the second separating operation. The tomatoes and dirt are further screened as they are carried to the upper end of the dirt conveyor. Any ripe tomatoes are removed and placed on the tomato discharge conveyor by one of the two sorters at station 28.

At this stage, the separation of the vines and foreign matter is completed, and the vines enter the shaking area with only attached tomatoes, both green and ripe. During the shaking, tomatoes drop directly onto the tomato discharge conveyor 32, or onto the return conveyor 36 which deposits them onto conveyor 32. The depleted vines are carried to the end of vine conveyor 22 and discharged onto the ground. The tomatoes on discharge conveyor 32 are carried between the two rows of sorters who remove green tomatoes and broken vine pieces and permit the ripe tomatoes to pass to the end of the conveyor 32 where they are received in a suitable container for transportation to the cannery.

From the foregoing description, it will be apparent that the present invention provides a method of and apparatus for harvesting tomatoes whereby not only the vines but also the loose tomatoes are gathered up and sorted. Further, the conveyor arrangement whereby small objects are separated from the vine mass first, then loose tomatoes and dirt clods, and finally the attached tomatoes, provides a novel, unique conveying system that carries out an efficient harvesting action.

Having thus described the invention, what is claimed as new and for which the protection of Letters Patent is desired is:

1. In a method of harvesting a crop including vines growing in a row, fruit attached to the portion of the vines above the surface of the soil and unattached fruit lying loose on the surface of the soil adjacent the vines, the steps of; gathering a mass having a lower side and longitudinally extending lateral sides, said mass including said portion of the vines, said attached fruit, and said unattached fruit; moving said mass in a predetermined direction by applying a propelling force at its lateral and lower sides, and conveying said mass subsequent to being moved to a fruit separating station.

2. In a method of harvesting a vine crop including vines growing in soil in a row, fruit attached to the portion of the vines above the surface of the soil and fruit lying loose on the surface of the soil adjacent the vines, the steps of; separating the vines from the ground, simultaneously gathering loose fruit on the surface of the soil and said separated vines with attached fruit in a mass having a bottom side, and having lateral sides extending longituidnally of said row, and moving said mass in a path of travel lengthwise of the row by applying a propelling force at said bottom side of the mass beginning at a point under said surface of the soil and by applying a propelling force at said lateral sides while applying said propelling force at said bottom side.

3. In a machine for gathering vines and attached tomatoes and loose tomatoes on the ground around the vines, channel means having side and bottom wall means which are substantially impervious to tomatoes, said channel means having predetermined forward and rearward portions, said side wall means having confronting gathering means mounted for movement rearwardly of the channel means, said bottom wall means having scooping means extending between said gathering means; means mounting said channel means for movement relative to said vines and tomatoes with said scooping means penetrating the ground to position said scooping means under loose tomatoes and to separate said vines from the ground whereby said vines and attached tomatoes are positioned on said scooping means, said scooping means being movable relative to said mounting means; means for imparting movement to said scooping means to move scooped-up loose tomatoes and vines and attached tomatoes rearwardly of the channel means; and means for imparting rearward movement to said gathering means whereby said gathering means also moves the vines rearwardly of said channel means.

4. In an apparatus for picking up loose tomatoes and growing tomato plants, said apparatus including a conveyor having a tomato receiving portion and means mounting the conveyor for earth traversing movement of said receiving portion in a predetermined direction relative to said plants; the combination of a pair of endless gathering members having inner runs; means mounting said gathering members so that they project forward from the receiving portion of the conveyor, and their inner runs in confronting relation to each other transversely of the path of movement of the receiving portion, and for movement of said inner runs in a direction opposite to the direction of said earth traversing movement of said receiving portion; ground engaging means projecting forward of the receiving portion of the conveyor and extending between said inner runs for penetrating the ground to gather loose tomatoes and growing vines and their attached tomatoes as said conveyor moves along; means for imparting movement to said ground engaging means relative to said conveyor mounting means to facilitate gathering of loose tomatoes and vines; and means for imparting said movement to the inner runs of the gathering members for moving the gathered loose tomatoes and vines onto the receiving portion of the conveyor.

5. In a machine for harvesting a vine crop having vines bearing fruit and being rooted in the ground; a frame having forward and rearward portions and being mounted for forward earth traversing movement with respect to the vine crop; a main conveyor supported in said frame and having a receiving portion adjacent to the ground during movement of the frame; vine severing means mounted in said frame having a forward earth penetrating portion, an inner portion and a rear portion adjacent to said receiving portion of said conveyor, said vine severing means being movable in a rearward direction in said frame so that vines engaged under ground by said vine severing means are severed and are conveyed up onto said main conveyor along with fruit borne by said vines and fruit lying loose on the ground adjacent to said vines; and a pair of guiding and loading members individually upstanding from said vine severing means, said guiding and loading members having transversely spaced inner portions defining a conveying passageway therebetween above said vine severing means, said inner portions providing vine and fruit engaging portions spaced longitudinally of said passageway and projecting inwardly of said passageway for moving vines and fruit through said passageway.

6. In an apparatus for picking up loose tomatoes and growing tomato plants from a row thereof, said apparatus including a conveyor having a tomato receiving portion and means mounting the conveyor for earth traversing movement of said receiving portion lengthwise of a row of tomato plants; the combination of a pair of discs having predetermined forward, rear and inner portions; means rotatably mounting the discs with their rear portions relatively adjacent to the receiving portion of the conveyor, with their inner portions lapping each other, and with their forward portions in earth penetrating engagement in advance of the receiving portion of the conveyor as the same moves along said row; endless gathering members; means mounting the gathering members in individually surrounding relation to the axes of rotation of the discs and extending upward from the discs, said members having lower edges adjacent to said discs, forward portions projecting forward from said receiving portion of the conveyor, and inner runs confronting each other across said discs whereby said discs and gathering members form a channel leading from the row into said conveyor; and means for moving the discs and gathering members so that the lapped inner portions of the discs and the inner runs of the members travel toward said conveyor.

7. In a machine for severing fruit bearing vines from the ground in which the vines are located in a row, a support mounted for forward earth traversing movement in a predetermined path of travel aligned with said row of vines, a pair of vine cutting discs mounted on said support for rotation about upstanding axes on opposite sides of said path of travel, said discs having adjacent inner portions, and a pair of endless conveying members individually upstanding from said discs and being mounted for circuitous travel about axes on opposite sides of said path, said conveying members having opposed inner runs, said inner runs and said discs defining a passageway through which severed vines and fruit are movable, said inner runs having means projecting into said passageway and upstanding from said discs for moving vines and fruit rearwardly therethrough when rearward travel is imparted to said inner runs.

8. In a machine for severing fruit-bearing vines from the ground in which the vines are located in a row, a support mounted for forward earth-traversing movement in a predetermined path of travel aligned with said row of vines, a pair of vine-cutting discs mounted on said support for rotation about upstanding axes on opposite sides of said path of travel, said discs having opposite forward and rearward portions and adjacent inner portions whereby the vines and the fruit thereon fall onto said discs, and a pair of endless conveying members individually upstanding from said discs and being mounted for circuitous travel about axes on opposite sides of said path, said conveying members having opposed inner runs, said inner runs and said discs defining a passageway through which severed vines and the fruit are movable, said inner runs having means projecting into said passageway for motivating vines and fruit rearwardly therethrough when rearward travel is imparted to said inner runs, said projecting means being resiliently yieldable outwardly of said passageway to preclude damage to fruit by minimizing compression thereon.

9. In a machine for severing fruit-bearing vines from the ground in which the vines are located in a row, a support mounted for forward earth-traversing movement in a predetermined path of travel aligned with said row of vines, a pair of vine-cutting discs mounted on said support for rotation about upstanding axes on opposite sides of said path of travel, said discs having opposite forward and rearward portions and adjacent inner portions between which encountered vines in said row are severed whereby the vines and the fruit thereon fall onto said discs, and a pair of endless conveying members individually upstanding from said discs and being mounted for circuitous travel about axes on opposite sides of said path, said conveying members having opposed inner runs, said inner runs and said discs defining a passageway through which severed vines and the fruit are movable, said inner runs having means projecting into said passageway for motivating vines and fruit rearwardly therethrough when rearward travel is imparted to said inner runs, said projecting means being resiliently yieldable outwardly of said passageway to preclude damage to fruit by minimizing compression thereon.

10. In a machine for harvesting a vine crop having vines bearing fruit and being rooted in the ground; a frame having forward and rearward portions and being mounted for forward earth-traversing movement with respect to the vine crop; a main conveyor supported in said frame and having receiving portion adjacent to the ground during said movement of the frame; a pair of vine cutting discs mounted in said frame for rotation about axes located forwardly adjacent to said receiving portion and being transversely spaced with respect to the path of movement of said frame, said discs having forward earth penetrating portions, adjacent inner portions, and rear portions adjacent to said receiving portion of said conveyor so that vines engaged underground between said discs are cut and are scooped up onto said main conveyor along with dirt and fruit borne by said vines; and a pair of endless guiding and loading belts individually upstanding from said discs and being mounted on said frame for circuitous travel in circumscribing relation to the disc axes associated with their respective discs, said belts having transversely spaced inner runs defining a conveying passageway therebetween above said discs, said inner runs providing resiliently compressible portions spaced longitudinally of said runs and projecting inwardly of said passageway for motivating vines, fruit, and dirt through said passageway but being yieldable outwardly of said passageway to minimize compression of the fruit being motivated along said passageway.

11. In a machine for gathering vines and fruit from the ground, said vines being rooted in the ground and being located in a row, an elongated support having opposite forward and rearward portions, means mounting said support for forward earth-traversing movement and along a path of travel aligned with the row of vines, a main conveyor extended longitudinally of and being borne by said support, said conveyor having a forward receiving portion, means mounted on said support and projecting forwardly from said receiving portion of the conveyor for removing vines from the ground during earth-traversing movement of said support and for scooping vines and fruit upwardly onto said conveyor, and a pair of endless flexible belts mounted on said support for circuitous travel about individual axes upstanding on opposite sides of said path of travel, said belts having opposed inner runs located over said scooping means and defining a gathering passageway therebetween aligned with said conveyor and through which said severed vines and fruit pass in moving onto said conveyor, each of said belts having an undulated contour throughout its length thereby providing alternate projections and indentations, each of said projections being resiliently compressible inwardly toward the axis of the respective belt whereby said projections function like conveyor cleats in motivating vines and fruit through said passageway but are yieldably outwardly of said passageway to prevent undue compression on the fruit.

12. In a machine for harvesting a row of vines and fruit borne by the vines, a mobile frame having opposite forward and rearward portions and being mounted for forward earth-traversing movement along a line of travel in alignment with the row of vines; a main conveyor having an upper run and a forward receiving portion; means on said frame mounting said conveyor longitudinally of said frame with its receiving portion projecting forwardly of said frame; rearwardly inclined, rotary cutting discs mounted on said frame having rear portions overlapping said receiving portion of said conveyor, overlapped inner portions, and forward earth penetrating portions, said discs being arranged to sever vines engaged between said inner portions during earth-traversing movement of said frame whereby said vines and fruit thereon are scooped up on said discs for movement onto said conveyor; and a pair of endless flexible belts mounted on said frame for circuitous travel about individual axes upstanding on opposite sides of said line of travel, said belts having opposed inner runs located over said discs and defining a gathering passageway therebetween aligned with said conveyor and through which said severed vines and fruit pass in moving onto said conveyor, each of said belts having an undulated contour providing upstanding convex projections and concave indentations with said projections being resiliently compressible whereby said projections motivate vines and fruit through said passageway but are yieldable to prevent undue compression of said fruit.

13. In a machine for severing fruit-bearing vines from the ground in which the vines are located in a row, a support mounted for forward earth traversing movement in a predetermined path of travel aligned with said row of vines, a pair of vine cutting discs mounted on said support for rotation about upstanding axes on opposite sides of said path of travel, said discs having opposite forward and rearward portions and adjacent inner portions between which encountered vines in said row are severed whereby the vines and the fruit thereon fall onto said discs, and a pair of endless conveying members individually upstanding from said discs and being mounted for circuitous travel about axes on opposite sides of said path, said conveying members having opposed inner runs providing front and rear sections, said front sections projecting forwardly in divergent relation to each other, said inner runs and said discs defining a passageway through which severed vines and the fruit are movable, said inner runs having means projecting into said passageway for motivating vines and fruit rearwardly therethrough when rearward travel is imparted to said inner runs, said projecting means being resiliently yieldable outwardly of said passageway to preclude damage to fruit by minimizing compression thereon.

14. In a machine for severing fruit-bearing vines from the ground in which the vines are located in a row, a support mounted for forward earth traversing movement in a predetermined path of travel aligned with said row of vines, a pair of vine cutting discs mounted on said support for rotation about upstanding axes on opposite sides of said path of travel, said discs having opposite forward and rearward portions and adjacent inner portions between which encountered vines in said row are severed whereby the vines and fruit thereon fall onto said discs, and a pair of endless conveying members individually upstanding from said discs and being mounted for circuitous travel about axes on opposite sides of said path, said conveying members having opposed inner runs providing front and rear sections, said front sections projecting forwardly in divergent relation to each other, said rear sections projecting rearwardly in divergent relation to each other, said inner runs and said discs defining a passageway through which severed vines and fruit are movable, said inner runs having means projecting into said passageway for motivating vines and fruit rearwardly therethrough when rearward travel is imparted to said inner runs, said projecting means being resiliently yieldable outwardly of said passageway to preclude damage to fruit by minimizing compression thereon.

15. In a harvester, an elongate support structure, a processing conveyor mounted on said structure and extending longitudinally of said structure, an articulated discharge conveyor having an inner section secured to said structure and projecting laterally therefrom, an outer section pivotally connected to the free end of said inner section, and a support mechanism connected between said structure and said outer conveyor section for holding said outer section in alignment with said inner section, said support mechanism including a tube on one section arranged to receive a rod on the other section in telescoped relation.

References Cited

UNITED STATES PATENTS 3,071,196    1/1963    Schiedenhelm  ---------- 171—62
3,078,926    2/1963    Ries et al.  ---------- 56—327 X ABRAHAM G. STONE, *Primary Examiner.*

ANTONIO F. GUIDA, *Examiner.*